United States Patent Office 3,004,956
Patented Oct. 17, 1961

3,004,956
HEAT RESISTANT RUBBER
Robert P. Cox, Madison, Wis., assignor to Bjorksten Research Laboratories, Inc., Fitchburg, Wis., a corporation of Illinois
No Drawing. Filed Feb. 20, 1956, Ser. No. 566,387
9 Claims. (Cl. 260—79.5)

This invention relates to the preparation of an elastomeric material which retains its physical properties and elasticity after prolonged exposure to high temperatures and to solvents.

Presently available elastomers do not retain their properties after prolonged exposure to elevated temperatures. It is the purpose of this invention to prepare elastomers which are relatively inexpensive, strong, thermally stable, and resistant to diester type lubricants.

We have discovered that copolymers composed of 1% to 6% by weight of vinyl trimethyl silane and 99% to 94% by weight of ethyl acrylate possess trimethyl silyl side-chains that stabilize the elastomers.

Instead of ethyl acrylate, any acrylate, methacrylate, or any monomer that is flexible after polymerization may be used. These would include methyl acrylate, perfluoro butyl acrylate, perfluoro ethyl acrylate, isoprene, chloroprene, butene-2, butadiene-styrene, butadiene-acrylo nitrile or other monomer combinations. In place of vinyl trimethyl silane, any alkenyl trialkyl silane or disilane, titanate or other organo metallic monomer capable of polymerizing to yield an organometallic side chain may be used. These would include allyl trimethyl silane, chloro allyl triethyl silane, vinyl silane, vinyl methyl tin diacetate, vinyl trimethyl titanate or other monomers. Thus any substance capable of undergoing vinyl polymerization and flexible in its polymerized form could be copolymerized with any alkenyl trialkyl silane or disilane or other organometallic monomer capable of copolymerization.

After copolymerization, the copolymer may be vulcanized by compounding the copolymer with a vulcanizing agent which may include sulfur, beta chloro ethoxy ethyl acrylate or a triamine base which is a reaction product of ethyl chloride, formaldehyde and ammonia, or any other conventional vulcanizing agents, and heating from 50 to 180° C. for about 3 to 180 minutes.

The following examples illustrate the invention and shows the preparation of the elastomer and the test results obtained with it.

*Example 1*

1–6% of vinyl trimethyl silane is copolymerized with ethyl acrylate, using the following emulsion polymerization formulation.

| | |
|---|---|
| 1.67% aqueous solution of Santomerse B (sulfonated ester, one of the salts of a homologous series of substituted aromatic sulfonic acids, sold commercially by the Monsanto Chemical Company) _____milliliters__ | 90 |
| 3% aqueous solution of $(NH_4)_2S_2O_8$ _____do____ | 10 |
| Monomers (silane ethyl acrylate) _____grams__ | 49.25 |
| Chloroethoxy ethyl acrylate_____do____ | 0.75 |
| Sharples 3B mercaptan (tertdodecyl-mercaptan sold by Sharples Chemicals, Inc.)_____do____ | 0.04 |

After agitation for 21 hours at 50° C. in a carbon dioxide atmosphere, the suspension is steam distilled, coagulated by the addition of NaCl, washed, dried, and prepared for vulcanization as follows:

| | Parts |
|---|---|
| Gum rubber_____ | 28 |
| Philblack O (one of a series of furnace carbon blacks manufactured by Phillips Chemical Co.)__ | 7 |
| Sulfur _____ | 0.28 |
| Stearic acid_____ | 0.28 |
| Trimene base (a reaction product of ethyl chloride, formaldehyde, and ammonia, the structure being complex, sold by Naugatuck Chemical Division of United States Rubber Company)_____ | 0.7 |

The above formulation is milled and vulcanized for 1–3 hours at 155° C. Tests of its properties are summarized below:

| Weight Loss (in percent) after 94 hours at 360° F. | Tensile Strength after 94 hours at 360° F. (in p.s.i.) | Percent Swelling after 72 hours in Penola oil at 350° F. | Flexibility after heating in air or Penola Oil |
|---|---|---|---|
| 9_____ | 250 | 35 | Good. |
| 9_____ | 300 | 31 | Good. |
| 7.5_____ | 320 | 42 | Good. |
| 6.5_____ | 370 | 33 | Good. |

Similar samples not containing trimethyl silane were embrittled after exposure to 360° F. for 94 hours in air. They lost 10% of their weight after such exposure and their tensile strengths are in the range of 0–140 p.s.i.

*Example 2*

49.5 gms. of purified ethyl acrylate, .7 gm. of chloroethyl acrylate and .5 gm. of vinyl trimethyl silane are added to 90 ml. of a 1.6% solution of Santomerse B in water. 10 ml. of 3% aqueous ammonium persulfate are added and the resultant emulsion is agitated at 50° C. for 6 hours and steam distilled to remove excess monomer. After coagulation by addition of solid NaCl, the white product is washed and dried. On pressing out into a clear and colorless film, the product exhibits considerable "snap" and a tensile strength of 350 p.s.i.

On compounding with 30% Philblack O, 1% stearic acid and 1% Trimene Base, and vulcanizing in a rubber mold for 1½ hours at 150° C., the product is found to have a tensile strength of 1200 p.s.i. When exposed to air at 350° F. for 250 hours, little surface effects are noted. After 500 hours, however, the product exhibits surface cracks on continued flexure. Swelling after 72 hours in 70–30 isooctane-toluene is 100% and after 250 hours in dioctyl sebacate at 350° F. is 9%.

*Example 3*

The polymerization conditions of Example 2 are repeated, but 1.5 grams of vinyl trimethyl silane are used instead of .5 gram. The properties of the vulcanizates are similar to those of Example 1, but the tensile strength is 1600 p.s.i. Swelling values are 6% and 6.5 for isooctane-toluene blend (72 hour immersion) and dioctyl sebacate (250 hours at 350° F.).

*Example 4*

Example 2 is repeated but 5 grams of acrylonitrile are added to the monomer charge. The tensile strength of the vulcanizate is 1400 p.s.i. For isooctane-toluene blend (72 hour immersion) and dioctyl sebacate (250 hours immersion at 350° F.) are 4 and 4.5%.

*Example 5*

Example 2 is repeated using a monomer charge of 48 grams of methyl acrylate and 2 grams of vinyl methyl diethoxy silane. The resulting product is clear, colorless, resilient and can be filled and vulcanized to yield heat and solvent-resistant vulcanizates.

*Example 6*

Example 2 is repeated but the monomer charge consists of 30 parts of n-butyl acrylate, .7 part of chloroethyl acrylate, 19 parts ethyl acrylate and 1 part of vinyl triethyl silane. The filled vulcanizate is stiffer and more susceptible to 70–30 isooctane-toluene than that described in Example 1, but is more resistant to polar solvents such as water and glycol. Samples remain flexible and lose 1% by weight after 400 hours exposure to air at 350° F.

*Example 7*

The product of Example 2 is modified by addition of tetrabutyl silane prior to vulcanization. Although other properties are not altered, the vulcanizate is found to be flexible after 700 hours without surface cracking. The unmodified vulcanizate develops surface cracks after 500 hours.

*Example 8*

Example 2 is repeated, substituting trifluoro ethyl acrylate for ethyl acrylate. The compounded gum is vulcanized and is found to exhibit excellent thermal stability in dry air. The vulcanizate is also found to resist the effects of chlorinated and aliphatic solvents.

*Example 9*

Example 8 is repeated with 2.2 dihydro perfluorobutyl acrylate in place of the trifluoro ethyl acrylate with similar results.

*Example 10*

Example 2 is repeated with chloroprene in place of ethyl acrylate. This product does not possess the thermal stability of the acrylate, but is roughly twice as stable as poly chloroprene without the vinyl trimethyl silane.

These examples further illustrate this invention but the invention is not restricted to these examples and modifications may be made without departing from the spirit of this invention.

I claim as my invention:

1. As a composition of matter, a copolymer consisting of a compound selected from the group consisting of alkyl esters of alpha beta unsaturated monocarboxylic acids containing not more than four carbon atoms copolymerized with 1% to 6% by weight of a compound selected from the group consisting of vinyl trimethyl silane, allyl trimethyl silane, chloroallyl trimethyl silane, vinyl triethyl silane, chloroallyl trimethyl silane, allyl triethyl silane.

2. As a composition of matter a copolymer consisting of a compound selected from the group consisting essentially of alkyl esters of alpha beta unsaturated monocarboxylic acids containing not more than four carbon atoms copolymerized with 1% to 6% by weight of vinyl trimethyl silane.

3. As a composition of matter, a copolymer consisting essentially of ethyl acrylate polymerized with 1 to 6% by weight of a compound selected from the group consisting of vinyl trimethyl silane, allyl trimethyl silane, chloroallyl trimethyl silane, vinyl triethyl silane, chloroallyl triethyl silane, allyl triethyl silane.

4. As a composition of matter, a copolymer consisting essentially of ethyl acrylate copolymerized with 1% to 6% by weight of vinyl trimethyl silane.

5. A vulcanized elastomer of the type described consisting essentially of copolymer of a compound selected from the group consisting of alkyl esters of alpha, beta unsaturated monocarboxylic acids containing not more than four carbon atoms and copolymerized with a 1–6% by weight of a compound selected from the group consisting of vinyl trimethyl silane, allyl trimethyl silane, chloroallyl trimethyl silane, vinyl triethyl silane, chloroallyl triethyl silane, allyl triethyl silane, said copolymer being vulcanized with a vulcanizing agent selected from the group consisting of sulphur, beta chloro ethoxy ethyl acrylate, and a reaction product of ethyl chloride, formaldehyde and ammonia, by heating at 50–180° C. for about 3 to 180 minutes.

6. As a composition of matter, a copolymer consisting essentially of a compound selected from the group consisting of alkyl esters of alpha, beta unsaturated monocarboxylic acids containing no more than four carbon atoms and copolymerized with 1 to 6% by weight of a vinyl trimethyl silane, said copolymer being vulcanized with a vulcanizing agent selected from the group consisting of sulphur, beta chloro ethoxy ethyl acrylate, and a reaction product of ethyl chloride, formaldehyde and ammonia, by heating at 50 to 180° C. for 3 to 180 minutes.

7. As a composition of matter, a copolymer consisting essentially of ethyl acrylate copolymerized with 1% to 6% by weight of a compound selected from the group consisting of vinyl trimethyl silane, allyl trimethyl silane, chloroallyl trimethyl silane, vinyl triethyl silane, chloroallyl triethyl silane, allyl trimethyl silane, said copolymer being vulcanized with a vulcanizing agent selected from the group consisting of sulphur, beta chloro ethoxy ethyl acrylate, and a reaction product of ethyl chloride, formaldehyde and ammonia, by heating at 50 to 180 C. for about 3 to 180 minutes.

8. As a composition of matter, a copolymer consisting essentially of ethyl acrylate copolymerized with 1 to 6% by weight of vinyl trimethyl silane, said copolymer being vulcanized with a vulcanizing agent selected from the group consisting of sulphur, beta chloro ethoxy ethyl acrylate, and a reaction product of ethyl chloride, formaldehyde and ammonia, by heating at 50 to 180° C. for about 3 to 180 minutes.

9. The method of making a vulcanized elastomer of the type described comprising the steps of copolymerizing a monomer selected from the group consisting of alkyl esters of alpha, beta unsaturated monocarboxylic acids containing not more than four carbon atoms and copolymerized with 1 to 6% by weight of a compound selected from the group consisting of vinyl trimethyl silane, allyl trimethyl silane, chloroallyl trimethyl silane, vinyl triethyl silane, chloroallyl triethyl silane, vulcanizing said copolymer with a vulcanizing agent selected from the group consisting of sulphur, beta chloro ethoxy ethyl acrylate, and a reaction product of ethyl chloride, formaldehyde and ammonia, by heating at 50 to 180° C. for about 3 to 180 minutes.

References Cited in the file of this patent

UNITED STATES PATENTS

| | | |
|---|---|---|
| 2,395,505 | Sarbach | Feb. 26, 1946 |
| 2,420,911 | Roedel | May 20, 1947 |
| 2,448,391 | Pyle | Aug. 31, 1948 |
| 2,532,583 | Tyran | Dec. 5, 1950 |
| 2,557,928 | Atkinson | June 26, 1951 |
| 2,628,246 | MacKenzie et al. | Feb. 10, 1953 |
| 2,716,638 | Cohen et al. | Aug. 30, 1955 |

OTHER REFERENCES

Bjorkesten et al.: WADC Technical Report, 53–299, August 1953, ASTIA, AD No. 17–943, Knott Bldg., Dayton, Ohio, pp. 10–13.

Sommer et al.: J.A.C.S., Mar. 20, 1954, pp. 1613–18, vol. 76